Figure 1:
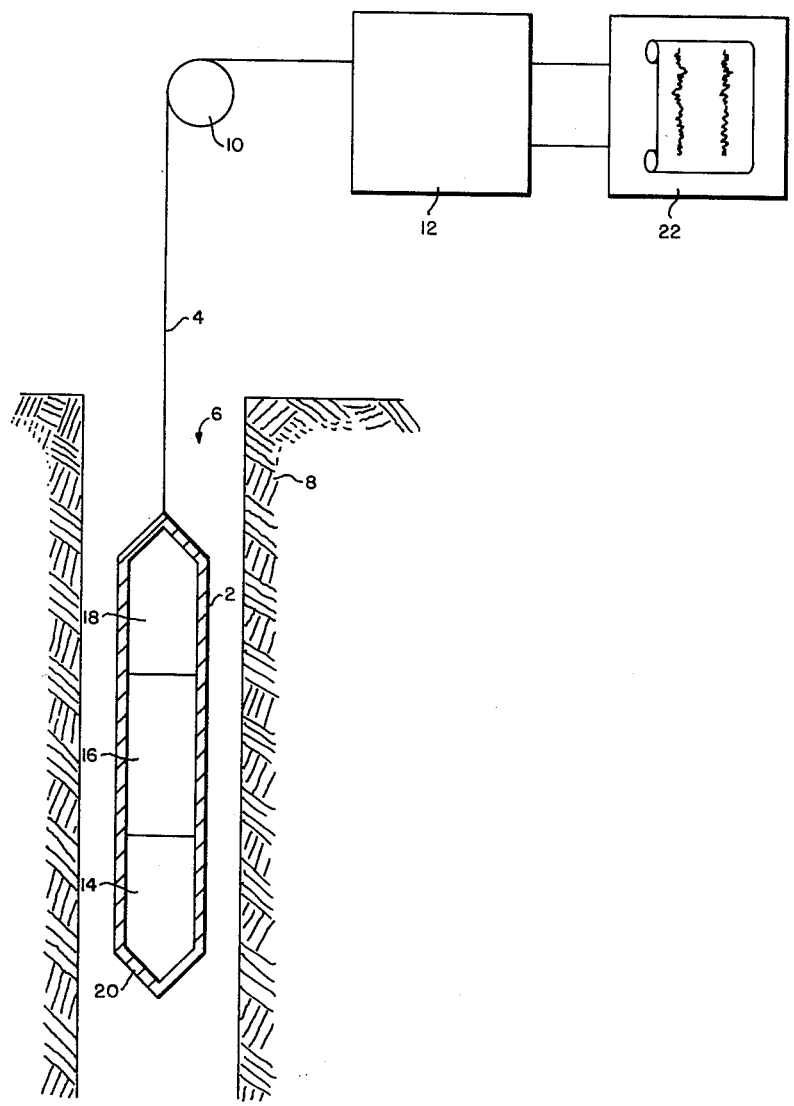

INVENTOR.
ROBERT L. TUCKER
BY Robert M. Sperry
AGENT

INVENTOR.
ROBERT L. TUCKER
BY Robert M. Sperry
AGENT

United States Patent Office 3,046,467
Patented July 24, 1962

3,046,467
APPARATUS FOR REGULATING BELT-TYPE
ELECTROSTATIC GENERATORS
Robert L. Tucker, Tulsa, Okla., assignor to Well Surveys
Incorporated, a corporation of Delaware
Filed Nov. 3, 1958, Ser. No. 771,624
5 Claims. (Cl. 322—2)

This invention relates to particle accelerators and is particularly directed to novel methods and apparatus for regulating and controlling particle accelerators employed in subsurface radioactivity well logging instruments.

In the art of radioactivity well logging, the use of particle accelerators, such as Van de Graaff accelerators, has become important for producing strong sources of high energy neutrons. These "artificial" neutron sources are particularly valuable since they emit neutrons without the accompanying gamma radiation normally emitted by "natural" neutron sources, such as mixtures of radium salts and beryllium. The use of particle accelerators for well logging is disclosed in U.S. Patent No. 2,689,918 to Arthur H. Youmans.

It is highly desirable to be able to regulate and control the operation of such accelerator sources. However, when an accelerator source is employed in radioactivity well logging operations, the accelerator is housed in a subsurface instrument which is suspended in a borehole to be logged and may be several miles below the surface of the earth. Consequently, control of such sources is extremely difficult to achieve and can only be accomplished by remote control systems transmitting signals over a conductor embodied in the suspending cable, as in the manner disclosed in the copending application of Eric C. Hopkinson, Serial No. 752,701, filed August 4, 1958, entitled "Control System for Artificial Sources of Radiation."

Systems have been provided heretofore for controlling subsurface accelerator sources. However, the prior art devices have generally employed a radiation detector, such as an ionization chamber, Geiger or proportional counter, or scintillation counter, located adjacent the accelerator source to monitor the output of the source. On the other hand, the monitor detector may be affected by radiation from sources other than that to be controlled. Moreover, the detecting devices are relatively large and require considerable additional circuitry for amplifying, shaping, integrating and otherwise processing the detector signal in preparation for transmission over the cable to the surface of the earth. Since well logging instruments may encounter temperatures of 450° F. and pressures as high as 30,000 pounds per square inch and undergo frequent severe mechanical shocks as they traverse the borehole, the complex electronic equipment required for the prior art systems is subject to frequent disorders. Consequently, such systems are not entirely satisfactory.

These disadvantages of prior art accelerator control systems are overcome with the present invention and novel means are provided for regulating and controlling subsurface accelerator sources which are compact in construction, simple in operation and which provide an accurate and reliable control of the accelerator output.

When a belt-type electrostatic generator, such as a Van de Graaff generator, is employed, it has been found that the neutron output of the source is functionally related to the charge carried by the belt. This charge is generally induced on the belt by an induction plate located adjacent the lower pulley of the generator. This lower pulley is grounded and there is a current flowing from the pulley to ground which is directly related to the amount of the charge induced on the belt. In accordance with the present invention, the pulley current is sampled and a portion of the current is converted by a simple two-tube circuit into a pulse type signal having a repetition rate which is proportional to the value of the charging current. The pulse signal may then be transmitted up the cable and employed to control an accelerator correction signal in the same manner as the signal from a monitor radiation detector has been employed in the prior art systems.

Accordingly, it is an object of the present invention to provide novel methods and apparatus for controlling an accelerator source.

Another object of the present invention is to provide novel methods and apparatus for determining the neutron output of an accelerator source.

A specific object of the present invention is to provide means for sampling the pulley current of a belt-type electrostatic generator and for deriving from the pulley current a pulse type signal having a repetition rate proportional to the value of the pulley current and, hence, proportional to the value of the current carried by the belt.

These and other objects and features of the present invention will be apparent from the following description wherein reference is made to the figures of the accompanying drawing.

Figure 2:
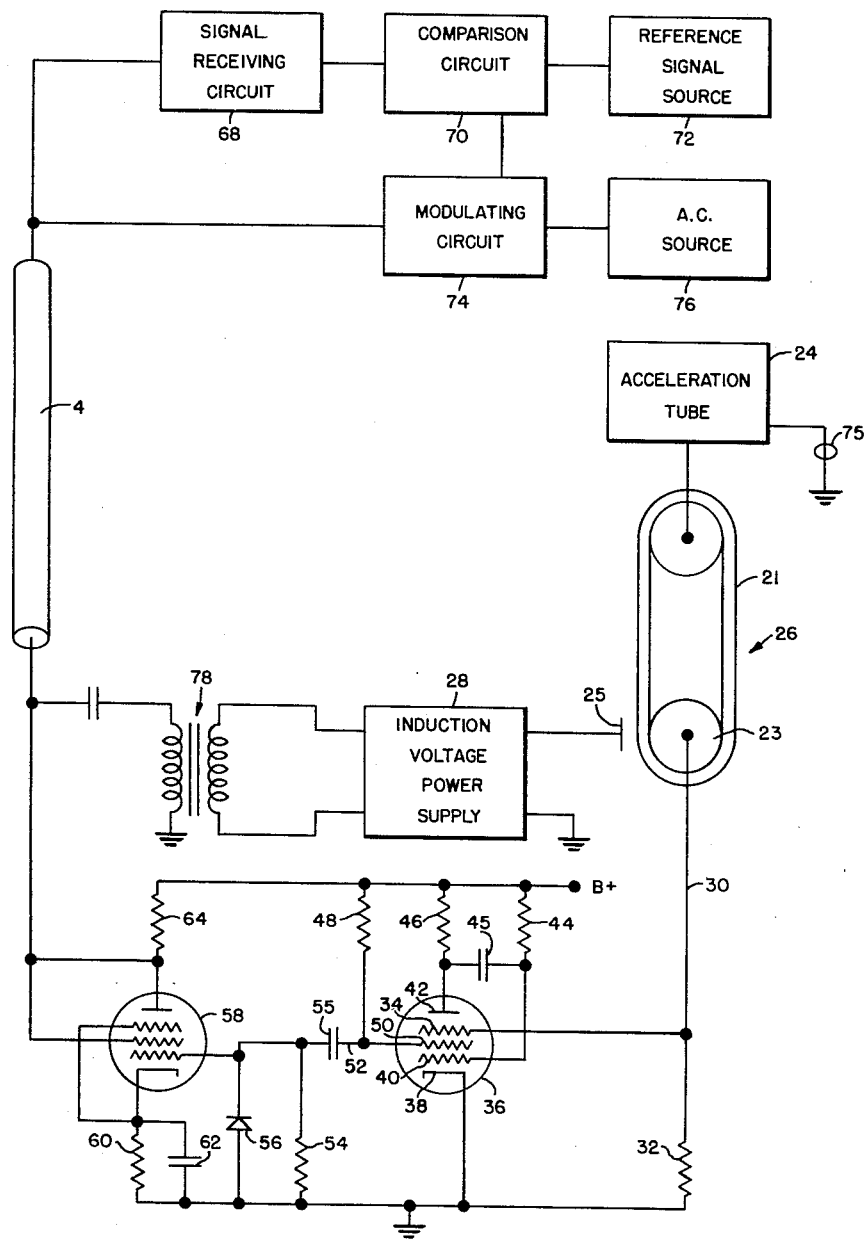

In the drawing:

FIG. 1 is a view, partly in section, of a typical radioactivity well logging instrument embodying the invention, suspended in a borehole penetrating the earth; and FIG. 2 is a diagrammatic representation of the electronic circuitry of the source control portion of the device of FIG. 1.

In that form of the present invention chosen for purposes of illustration in the drawing, FIG. 1 shows a subsurface radioactivity well logging instrument 2 suspended by means of a cable 4 in a borehole 6 which penetrates the earth 8. The cable 4 may be wound onto or off of a suitable drum 10 at the surface of the earth to traverse the borehole 6 with the instrument 2. The cable 4 includes at least one electrical conductor which serves to transmit signals between the subsurface instrument 2 and the surface equipment 12. The subsurface instrument 2 comprises a source portion 14, a detector portion 16 and an electronic portion 18, all enclosed in a suitable pressure resistant housing 20. The source portion 14 of the instrument contains an artificial source of radiation, such as one employing the deuterium-tritium reaction, and may include a Van de Graaff generator of high accelerating voltage, while the detector portion 16 contains one or more suitable radiation detectors, such as ionization chambers, Geiger or proportional counters or scintillation counters, which may be sensitive either to gamma rays or to neutrons or to both. The electronic portion 18 contains suitable electronic circuitry, such as amplifiers, pulse shaping circuits and the like, for processing the signals from the detectors and for impressing the signals on said conductor for transmission up the cable 4 to the surface equipment 12. In the surface equipment 12, the signals are further processed and the information contained in the signals is displayed in correlation with depth in a conventional manner by a suitable recorder 22.

FIG. 2 illustrates the circuitry required for applicant's novel apparatus for stabilizing the neutron output of the artificial source. The circuits for the detectors of the detector portion 16 of the subsurface instrument 2 and the circuits for processing the signals from these detectors in both the subsurface instrument 2 and the surface equipment 12 may be conventional and are not necessary to a description of the present invention. Accordingly, they are not shown in detail in the drawings. As seen in FIG. 2, the source portion 14 of the subsurface instrument comprises an acceleration tube 24 which may contain deuterium gas and a tritium target or other suitable means for producing high energy neutrons. The acceleration tube 24 is energized by a suitable high voltage generator 26, such as a Van de Graaff generator having a belt 21, a lower pulley 23 and an induction plate 25 which is charged by a suitable power supply 28 having a variable output. The belt is driven by conventional means not shown. Similarly, other conventional components of the well logging system, not forming a part of the invention, are not illustrated.

It has been found that the neutron output of the acceleration tube 24 is a direct function of the charge applied to the induction plate 25 of the Van de Graaff generator 26. Moreover, the current flowing from pulley 23 to ground is a direct function of the charge applied to the belt 21 by the induction plate 25. Consequently, the neutron output of the acceleration tube 24 may be stabilized and controlled by sampling the pulley current and providing means responsive to any change in the pulley current for providing a correction factor which may be applied to vary the output of power supply 28 to cause a variation in the charge on the induction plate 25. The circuitry for performing these functions may be located in the source portion 14, in the electronics portion 18, or part in each, with appropriate surface components.

In accordance with the present invention, the current from pulley 23 to ground flows through conductor 30 and a sensing resistor 32 to ground to establish a voltage which is directly proportional to the value of the current carried by the belt 21. This voltage is then converted to a pulse signal by means of a phantastron circuit. Thus, voltage from resistor 32 is applied to the suppressor grid 34 of a pentode 36 which has a grounded cathode 38 and has its control grid 40 connected to the circuit of the plate 42 through a resistance-capacitance circuit 44—45. Resistor 46 is a conventional plate load resistance and resistor 48 is a voltage dropping resistance for the screen grid 50. With this arrangement, the output of the tube 36 may be taken from the screen grid 50 and appears on conductor 52 as a square wave type signal having a repetition rate proportional to the voltage applied to the suppressor grid 34. Since, as described above, this voltage is developed across resistor 32 by the pulley current, the repetition rate of the square waves is a direct function of the value of the current carried by belt 21 and any changes in the value of the current on the belt 21 will be indicated by a corresponding change in the repetition rate of the square wave output of tube 36.

The square wave signal is then differentiated by resistance-capacitance circuit 54—55 which converts the square waves to alternate positive and negative pulses. Diode 56 serves to permit passage of pulses of one polarity to the grid of tube 58 and short circuits pulses of the opposite polarity to ground. As shown, only positive pulses are passed. However, this is purely a matter of choice and the circuit could, if desired, be made to pass only negative pulses, by reversing diode 56, or to pass both positive and negative pulses, by removing diode 56. The desired pulse signal is then amplified by a suitable amplifier tube 58 and is applied directly to a conductor of cable 4 for transmission to the surface of the earth. Resistance 60 is a cathode biasing resistance for amplifier 58 and capacitor 62 serves to ground the cathode of amplifier 58 for pulses while resistor 64 provides a plate load for tube 58.

At the surface of the earth, the pulse signal may be removed from the cable 4 by a suitable signal receiving circuit 68 and compared by a suitable comparison circuit 70 with a signal from a reference signal source 72. Any difference between the signals from the signal receiving circuit 68 and the reference signal source 72 may be supplied to an appropriate modulating circuit 74 to modulate an alternating current signal from alternating current source 76. The modulated alternating current may then be impressed on the cable 4 for transmission to the subsurface instrument 2 where the signal may be removed from the cable 4 by transformer 78 and employed to regulate the output of power supply 28 to compensate for any variation from the desired value of the charge on the belt 21. A more detailed description of such comparison and compensation circuits is provided in the aforementioned copending application of Eric C. Hopkinson, Serial No. 752,701, filed August 4, 1958.

If desired, the signal from applicant's device may be transmitted to the surface and recorded without providing the comparing and compensating circuits of Hopkinson to merely indicate whether or not the power supply 28 and Van de Graaff generator 26 are functioning properly. Such an indication is useful as a supplement to the radiation monitor control of Hopkinson since the Hopkinson system is influenced by changes in the acceleration tube 24 as well as by changes in the generator 26 and power supply 28. Thus, in the event of a failure in the acceleration tube 24, the Hopkinson system would indicate that a failure had occurred but would not localize the failure whereas, with the addition of applicant's device, it would be apparent that the failure was not due to the power supply 28 or generator 26. Consequently, the failure could be located and corrected much more rapidly.

As a further alternative, the sensing resistor 32 could be connected between the acceleration tube 24 and ground, as indicated at 75. The device would then provide a direct indication of the current flowing through the acceleration tube 24 which current is, of course, provided by the generator 26.

As noted above, the signal from tube 36 may be converted to either positive or negative pulses or both by appropriate connection of diode 56. Moreover, numerous other variations and modifications may also be made without departing from the present invention. Accordingly, it should be clearly understood that the form of the invention described above and shown in the figures of the accompanying drawings is illustrative only and is not intended to limit the scope of the invention.

I claim:

1. A device for indicating the charge carried by the belt of a belt-type electrostatic generator, said device comprising means for generating a voltage proportional to the current carried by said belt, means responsive to said voltage for emitting a pulse type signal having a repetition rate proportional to the value of said voltage, and means responsive to the repetition rate of said pulse type signal for providing an indication of the current carried by said belt.

2. A device for indicating the charge carried by the belt of a belt-type electrostatic generator having a belt pulley and an induction plate adjacent said pulley for inducing an electrical charge on said belt from said pulley, said device comprising resistive means connected between said pulley and ground for deriving from electric current flowing from said pulley to ground a voltage proportional to the value of the current carried by said belt, a circuit connected to receive the voltage developed across said resistive means and to emit a pulse type signal having a repetition rate proportional to the value of said voltage, and means responsive to the repetition rate of said pulse type signal for providing an indication of the current carried by said belt.

3. A device for controlling the output of a particle accelerator embodying a belt-type electrostatic generator and a variable output power supply providing induction potential to charge the belt of said generator, said device comprising means for generating a voltage proportional to the current carried by the belt of said generator, means responsive to said voltage for emitting a pulse type signal having a repetition rate proportional to the value of said voltage, and means responsive to said pulse type signal for controlling the output of said power supply.

4. A device for controlling the output of a particle accelerator supplied with current by a belt-type electrostatic generator, the belt of which is charged with charge induced thereon by a charged induction plate, said device comprising resistive means connected to pass current therethrough to charge said belt, and means for utilizing the voltage developed across said resistive means to control the charge on said induction plate whereby said charging current is stabilized.

5. A device for controlling the output of a particle accelerator supplied with particle accelerating voltage by a belt-type electrostatic generator, the belt of which is charged with charge induced thereon from a belt pulley by a charged induction plate, said device comprising resistive means series connected in the belt pulley charging current circuit, means for deriving from current flowing through said resistive means a signal systematically related thereto, a reference signal source, electronic means for comparing said reference signal with said derived signal and producing a comparison signal systematically related to the difference between said signals, and means for utilizing said comparison signal to vary the charge on said induction plate to reduce said comparison signal substantially to nothing.

References Cited in the file of this patent

UNITED STATES PATENTS

| | | |
|---|---|---|
| 2,799,002 | Morel | July 9, 1957 |
| 2,842,695 | Goodman | July 8, 1958 |
| 2,858,501 | Gale | Oct. 28, 1958 |

OTHER REFERENCES

Electron-tube Circuits, by S. Seely, pp. 431–432, McGraw-Hill Book Co., Inc., 1950.